Patented May 26, 1953

UNITED STATES PATENT 2,640,046

REACTION PRODUCTS OF AN ALDEHYDE AND AN ALDEHYDE-REACTABLE COMPOSITION COMPRISING THE CONDENSATION PRODUCT OF A POLYHALOGENATED COMPOUND AND A TRIAZINE DERIVATIVE

Jack T. Thurston, Old Greenwich, Conn., assignor to American Cyanamid Company, New York, N. Y., a corporation of Maine No Drawing. Application May 10, 1951, Serial No. 225,682

10 Claims. (Cl. 260—67.8)

This invention relates to the production of new synthetic materials and more particularly to new resinous compositions which are especially suitable for use in the plastics and coating arts. The invention specifically is concerned with compositions comprising a resinous material obtained by effecting reaction between ingredients comprising (1) an aldehyde (including polymeric aldehydes, hydroxyaldehydes and aldehyde-addition products) and (2) a composition resulting from a condensation reaction between ingredients including (a) at least one triazine derivative represented by the general formula I
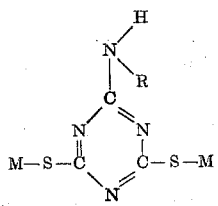

where R represent a member of the class consisting of hydrogen and monovalent hydrocarbon radicals, more particularly alkyl, cycloalkyl, aralkyl, aryl and alkaryl radicals, and M represents an alkali metal (e. g., sodium, potassium, etc.) and (b) a compound having at least two but not more than three halogen atoms (more particularly chlorine or bromine atoms) attached to a radical selected from the group consisting of polyvalent hydrocarbon and oxyhydrocarbon (including hydroxyhydrocarbon) radicals, each halogen being attached to a carbon atom in which all four valences are satisfied by single bonds.

The present invention also includes within its scope compositions comprising a resinous material obtained by effecting reaction between ingredients comprising (1) an aldehyde (including polymeric aldehydes, hydroxyaldehydes, and aldehyde-addition products) and (2) a composition resulting from a condensation reaction between (a) a plurality of triazine derivatives one of which corresponds to Formula I and another of which is represented by the general formula II
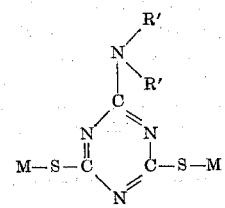

where R' represents a monovalent hydrocarbon radical, more particularly an alkyl, cycloalkyl, aralkyl, aryl or alkaryl radical, and M represents an alkali metal and (b) a halogenated compound of the kind described under (b) in the first paragraph of this specification.

Illustrative examples of monovalent hydrocarbon radicals represented by R and R' in the above formulas are methyl, ethyl, propyl, butyl, isopropyl, isobutyl, amyl, octyl, decyl, octadecyl, 2-ethylhexyl, phenyl, naphthyl, xenyl, cyclopentyl, cyclohexyl, tolyl, xylyl, ethylphenyl, benzyl, phenylethyl, tolylethyl, phenylpropyl, etc. The radicals represented by R' and in Formula II may be the same or different.

The aldehyde-reactable compositions used in practicing the present invention are more fully described and claimed in my copending application Serial No. 225,681, filed concurrently herewith.

It is an object of the present invention to prepare a new class of synthetic materials, more particularly resinous compositions, which have particular utility in the plastics and coating arts, e. g., as coating, laminating, adhesive, impregnating, casting and molding compositions, as well as in other applications. Other objects of the invention will be apparent to those skilled in the art as the description of the invention proceeds.

The present invention is based on my discovery that new and valuable materials for use in coating, molding and other applications can be prepared by effecting reaction between ingredients comprising (1) an aldehyde, including polymeric aldehydes, hydroxyaldehydes, and aldehyde-addition products (e. g., formaldehyde, paraformaldehyde, aldol, dimethylol urea, trimethylol urea, trimethylol melamine, etc.), and (2) an aldehyde-reactable composition of the kind described briefly in the first paragraph of this specification and more fully in my aforementioned copending application. Some of the condensation products of this invention are thermoplastic materials even at an advanced stage of condensation, while others are thermosetting bodies that convert under heat or under heat and pressure to an insoluble and infusible state. The thermoplastic condensation products are of particular value as plasticizers for synthetic resins that have unsatisfactory plasticity or flow characteristics. The thermosetting or potentially thermosetting condensation products, alone or mixed with pigments, dyes, plasticizers, lubricants, curing agents, etc., may be used, for example, in the production of molding compositions. The liquid intermediate condensation products of this invention may be concentrated or diluted further by the removal of or addition of volatile solvents to form liquid coating compositions of adjusted viscosity and concentration. The heat-convertible or potentially heat-convertible resinous condensation products may be used in liquid state, for instance, as surface-coating materials, in the production of paints, varnishes, lacquers, enamels, etc., for general adhesive applications, in producing laminated articles and for numerous other purposes.

The aldehyde-reactable compositions, more particularly aldehyde-reactable polymers, which are used in practicing my invention are prepared by effecting reaction between ingredients including (1) a triazine derivative of the kind embraced by Formula I, or a mixture of such triazine derivatives, or a mixture containing such a triazine derivative and a triazine derivative of the kind covered by Formula II, and (2) a polyhalogenated compound, more particularly a di- or trichlorinated or a di- or tribrominated compound wherein each halogen is attached to a carbon atom in which all four valences are satisfied by single bonds. The grouping containing the halogen is further characterized by being a hydrocarbon or an oxyhydrocarbon radical. Included within these classes of radicals are the acyclic hydrocarbon radicals, acyclic oxyhydrocarbon radicals, and aromatic-substituted aliphatic radicals in which latter the aliphatic portion is either an acyclic hydrocarbon, or an acyclic oxyhydrocarbon radical. The reaction is usually conducted under heat, preferably below 150° C., in order to minimize side reactions. In most cases, the reaction starts at about 70–80° C.

The reaction between the triazine derivative and the polyhalogenated compound may be effected in the presence or absence of an inert diluent or solvent, that is, a liquid which is inert during the reaction, e. g., water, ethylene glycol monoethyl ether, dioxane, toluene, xylene, etc. If water is employed as a reaction medium, it is sometimes preferable to employ a small quantity of an emulsifying agent in order to assure more intimate contact of the two reactants which, in turn, results in the formation of a polymer of a molecular weight higher than that obtained without an emulsifying agent. The preferred method of operating, when an emulsifying agent is utilized, is to form a preliminary emulsion of the halogenated compound in water, then adding the emulsion to a mixture of the triazine derivative and water under reacting conditions.

The proportions of the triazine derivative and the polyhalogenated compound may be considerably varied, e. g., from approximately equimolecular proportions of each reactant to from 2 to 3 moles of the polyhalogenated compound per mole of the triazine derivative. I prefer, however, to use the polyhalogenated compound and the triazine derivative in approximately stoichiometrical proportions.

The total time of the reaction between the triazine derivative and the polyhalogenated compound will vary considerably depending, for example, upon the size of the batch, the particular reactants employed and other influencing factors. Ordinarily, however, the reaction time required will vary from about ½ hour up to about 8 hours.

The properties of the aldehyde-reactable compositions also may be varied by using a plurality of halogenated compounds or a plurality of triazine derivatives or by incorporating various modifying ingredients (e. g., a monohalogenated compound) into the reaction mass before or during the reaction between the primary ingredients.

Illustrative examples of polyhalogenated compounds that may be employed in preparing the aldehyde-reactable compositions used in practicing the present invention are:

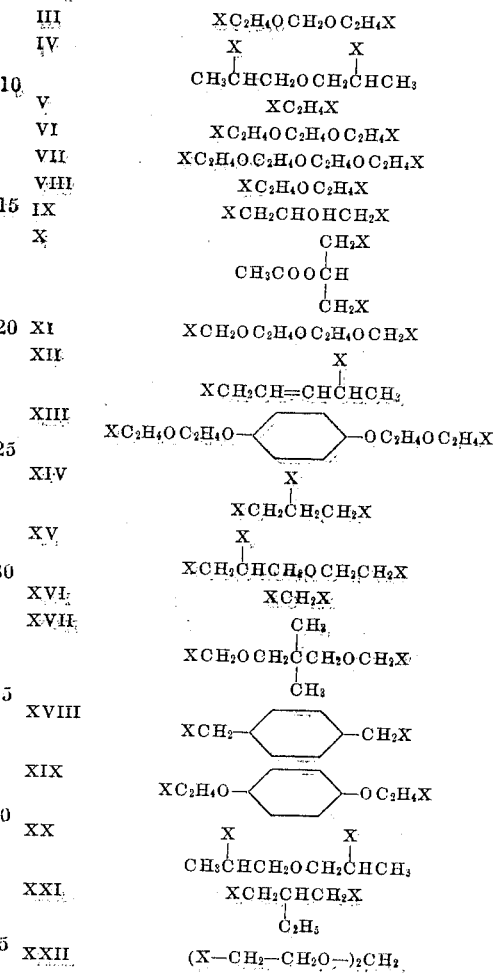

The aldehyde-reactable compositions used in practicing the present invention vary from liquid products to resinous materials which are solid or semi-solid at room temperature. Reference is made to my copending application Serial No. 225,681 for additional information, including numerous examples, relative to the preparation of these materials.

In practicing my invention the initial condensation reaction may be carried out at normal or an elevated temperature, at atmospheric, subatmospheric, or superatmospheric pressures, and under neutral, alkaline, or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di-, or triamine, etc. Illustrative examples of acid condensation catalysts that may be employed are inorganic or organic acids such as hydrochloric, sulfuric, phosphoric, acetic, lactic, acrylic, phthalic, maleic, etc., or acid salts such as sodium acid sulfate, monosodium phosphate, monosodium phthalate, etc. Mixtures of acids, of acid salts or of acids and acid salts may be employed if desired.

The reaction between the aldehyde, e. g., formaldehyde, and the polymer may be carried out in the presence of solvents or diluents, other natural or synthetic bodies (numerous examples of which hereafter are given), or while admixed with other materials which are reactable or non-reactable with the aldehyde reactant or with the polymer, e. g., urea, thiourea, cyanamide, dicyandiamide, phthalic diamide, acetamide, chlorinated acetamides, methyl ethyl ketone, etc.; aldehyde-reactable triazinyl compounds other than the linear polymers used in practicing the present invention, e. g., melamine, ammeline, ammelide, etc.; phenol and substituted phenols, e. g., the cresols, the xylenols, the tertiary-alkyl phenols etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, etc.; amines, including aromatic amines, e. g. aniline, and the like.

The modifying reactants may be incorporated with the aldehyde and the aldehyde-reactable polymer to form an inter-condensation product by mixing all the reactants and effecting condensation therebetween under acid, alkaline, or neutral conditions or by various permutations of reactants. For example, I may effect partial reaction or condensation between the chosen aldehyde and the polymer, then add the modifying reactant, e. g. urea, melamine, etc., and effect further condensation. Or, I may first partially react urea, melamine, or other aldehyde-reactable modifying reactant with a molecular excess of an aldehyde under acid, alkaline, or neutral conditions, then add the polymer and effect further condensation. Or, I may separately partially react (1) urea, melamine, or other aldehyde-reactable modifying reactant and an aldehyde and (2) a polymer of the kind above described and an aldehyde, thereafter mixing the two products of partial reaction and effecting further reaction or condensation therebetween. The reactants of (1) and (2) initially may be partially condensed under acid, alkaline, or neutral conditions.

In producing these new condensation products, the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butylaldehyde, heptaldehyde, octaldehyde, methacrolein, crotonaldehyde, benzaldehyde, furfural, hydroxyaldehydes (e. g. aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Good results are obtained with aldehyde-addition products such as methylol urea, more particularly mono- and di-methylol ureas, and a methylol melamine. Mixtures of aldehydes and aldehyde-addition products may be employed, e. g., mixtures of formaldehyde and methylol compounds such as dimethylol urea, trimethylol melamine, hexamethylol melamine, etc.

The ratio of the aldehyde reactant to the polymer may be varied over a wide range depending, for example, upon the number of aldehyde-reactable amino groups in the polymer and upon the properties desired in the finished product. The aldehyde is used in an amount sufficient to react with from one to all of the reactive amino groups in the polymer. Ordinarily the reactants are employed in an amount corresponding to at least one mole of the aldehyde for each mole of the polymer. I may use, for instance, from 0.1 to 2 moles of the aldehyde, e. g., formaldehyde, for each aldehyde-reactable recurring unit in the polymer.

When the aldehyde is available for reaction in the form of an alkylol derivative, more particularly a methylol derivative, e. g., dimethylol urea, trimethylol melamine, etc., amounts of such alkylol derivatives corresponding to or higher (e. g., from a few percent more to 15 or 20 times as much) than the relative amounts mentioned above with reference to the aldehyde may be used.

In order that those skilled in the art better may understand how the present invention may be carried into effect the following examples are given by way of illustration and not by way of limitation. All parts are by weight.

*Example 1*

A

A linear polymer is prepared from the disodium salt of dithioammelide, the disodium salt of N,N-dibutyl dithioammelide and $\beta,\beta'$-dichloroethyl formal according to the technique of Example 1 of my copending application Serial No. 225,681, filed concurrently herewith.

B

|  | Parts |
|---|---|
| Linear polymer of A | 26.5 |
| Aqueous formaldehyde (approximately 37% HCHO) | 10.0 |

Into a reaction vessel equipped with a stirrer and a reflux condenser is placed the linear polymer dissolved in 100 parts of ethylene glycol monomethyl ether, and to this solution is added 3 parts of phosphoric acid solution (10% in butanol). The mixture is refluxed for ten minutes and then cooled to about 80° C., whereupon the aqueous formaldehyde is added. After refluxing for 45 minutes, water is azeotropically removed at atmospheric presssure. Ethylene glycol monomethyl ether is added during the distillation to replace that distilled. When the temperature reaches 120° C., the solution is concentrated to a solids content greater than 50% under vacuum at 90° C. The solids content is determined by drying a tarred sample at 105° C. for 2 hours. The resulting solution is adjusted to a concentration of 50% solids by addition of ethylene glycol monomethyl ether to form a lacquer. The lacquer product provides good, hard, flexible films when cured on a tin panel for 30 minutes at 125° C. In this example the ratio of formaldehyde to linear polymer is approximately 1.3 moles of the former for each recurring unit in the latter.

Example 2

A

A granular linear polymer is prepared according to Example 5 of my copending application Serial No. 225,681, filed concurrently herewith. The starting materials for this polymer are the disodium salt of dithioammelide and $\beta,\beta'$-dichlorethyl ether.

B

Sixteen hundred and thirty-seven (1637) parts of the polymer of "A" above, 263 parts of 37% aqueous formaldehyde and 350 parts of water are placed in a reaction vessel, and the temperature of the resulting slurry is raised to about 90° C. After 4 hours at 90° C. with constant agitation at a pH of approximately 7.5, a creamy, custard-like slurry forms. This slurry is cooled and filtered. A granular solid is recovered. The yield is approximately 56% of the theoretical.

Example 3

Into a reaction vessel equipped with a reflux condenser, stirrer, and thermometer are placed 96 parts of dithioammelide, 48 parts of sodium hydroxide and 600 parts of water and the mixture is heated to 80° C. Eighty-five and eight-tenths (85.8) parts of $\beta,\beta'$-dichloroethyl ether is added slowly to the mixture while increasing the temperature to slow reflux. After 3 hours at reflux, a granular white solid precipitates. At this point, 5 parts of 37% aqueous formaldehyde is added. The granules grow in size until ½ hour after the formaldehyde has been added when a large, white slug of gummy resin forms. After an additional ½ hour at reflux, the liquid is decanted and the glob of resin is cooled. On cooling it becomes quite brittle and is ground and washed. The resin is then dried for 24 hours at 50° C. in a hot air oven. The yield is 130 parts of granular solid. The pH of the solution is strongly alkaline throughout the reaction.

Example 4

One thousand and eighty (1080) parts of the linear polymer obtained in A of Example 2, 108 parts of paraformaldehyde, 5.9 parts of maleic anhydride, and 5.9 parts of zinc stearate are mixed and ground in a ball mill. The powder prepared in this manner is then added to a pair of mixing rolls at an initial temperature of 75° C. on the front roll and 115° C. on the back roll. After 15 minutes the temperature of the front roll is raised to 115° C. After an additional 10 minutes the temperature of both rolls is raised to 125° C. to shorten the rolling time. After 15 minutes at this temperature, the material has stiffened appreciably and is taken off. The resin has turned a light tan color just before removal from the rolls. The material after cooling is ground and ball-milled to give a fine, free-flowing powder.

The powder prepared in the preceding paragraph is molded under heat and pressure. Unfilled, molded test pieces of the material were evaluated in physical tests as follows:

| | |
|---|---|
| Density | 1.44 |
| Volatile content (percent) | 8.31 |
| Water absorption (percent) | 0.23 |
| Mold shrinkage (mils per inch) | 16.2 |
| Flexural strength (p. s. i.) | 10,000 |
| Deflection (mils per inch) | 115 |
| Impact-ski ball (ft. lbs. inch) | 0.157 |
| Hardness—Barcol | 29 |
| Heat distortion deg. C | 67 |

Example 5

A polymer is prepared from $\beta,\beta'$-dichloroethyl formal and the disodium salt of dithioammelide according to the procedure of Example 7 of my copending application Serial No. 225,681, filed concurrently herewith. One hundred sixty-four and five tenths (164.5) parts of the polymer, 250 parts of butanol, 105.5 parts of 37% aqueous formaldehyde, 12.6 parts of melamine, and 1 part of phosphoric acid are placed in a reaction vessel. This mixture is heated to 138° C. and refluxed for ½ hour. The butanol is then partially distilled off at 90° C. There is obtained 277 parts of a clear lacquer containing about 60% solids. The lacquer is soluble in ethylene glycol monomethyl ether and insoluble in xylene.

Example 6

A linear polymer is prepared from the disodium salt of dithioammelide and $\beta,\beta'$-dichloroethyl ether according to the procedure of Example 5 of my copending application Serial No. 225,681, filed concurrently herewith. Five hundred and twenty-seven (527) parts of the linear polymer and 1050 parts of normal butanol are placed in a reaction vessel equipped with a stirrer and reflux condenser. The mixture is heated to reflux and 4.5 parts of phosphoric acid (10% in butanol) is added. Immediately afterward, 272 parts of 37% aqueous formaldehyde is added. After 10 minutes at reflux, the reaction mixture is distilled at a temperature of about 85° C. under vacuum. After cooling there is present 552 parts of a syrupy lacquer having a solids content of about 77.5%.

It will be understood, of course, by those skilled in the art that my invention is not limited to the specific reactants nor to the specific conditions of reaction shown in the above-illustrative examples. For instance, the reaction may be effected at temperatures ranging from room temperature to the fusion or boiling temperature of the mixed reactants, the reaction proceeding more slowly at normal temperatures than at elevated temperatures in accordance with the general law of chemical reactions.

The curing of the thermosetting or potentially thermosetting resinous compositions of this invention may be accelerated by incorporating therein a curing agent (or a mixture of curing agents), for instance, a direct or active curing catalyst (e. g., phthalic acid, phthalic anhydride, maleic acid, maleic anhydride, succinic acid, citric acid, etc.), or a latent curing catalyst (e. g., an ammonium salt of phosphoric acid, ammonium silicofluoride, benzoyl phthalimide, etc.). Catalysts which are capable of intercondensing with the partial reaction product may be employed, for instance, curing reactants such as glycine, sulfamic acid, chloroacetone, chloroacetyl urea, etc. The amount of curing catalyst, if used, may be varied as desired or as conditions may require, but ordinarily is within the range of 0.1 to 5 or 6 percent by weight of the thermosetting or potentially thermosetting resinous product.

Illustrative examples of modifying bodies that may be incorporated into the resinous compositions of this invention are melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-formaldehyde condensation products, (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

Dyes, pigments, driers, curing agents, plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the resinous materials of my invention, as desired or as conditions may require, in order to provide a coating, molding or other composition best adapted to meet a particular service use. For additional and more detailed information concerning the modifying ingredients that may be employed in producing coating compositions from my new resins, reference is made to the aforementioned Moore patent.

The modified and unmodified resinous compositions of this invention have a wide variety of uses. For example, in addition to their use in the production of coating and molding compositions, they may be employed as modifiers of other natural and synthetic resins. Thus, they may be used to improve the plasticity or flow characteristics of thermosetting resins which have insufficient or unsatisfactory plasticity during curing to an insoluble, infusible state, e. g., certain urea-formaldehyde resins where better flow during molding, without decreasing the curing time, is desirable. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making laminated plywood, as an impregnant of pulp performs from which molded articles thereafter are made by subjecting the impregnated perform to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also may be used for treating textile materials (e. g., cotton, linen, rayon and other cellulose containing textiles, wool, silk and other natural or synthetic proteinaceous textiles, including nylon and textiles derived from casein, soyabeans, etc.), in filament, thread, yarn, fabric (woven or felted) or other form, in order to improve the properties of such textile materials, e. g., to increase the stiffness, to increase the service life, or otherwise to enhance the properties of the treated materials and to make them more useful or serviceable to the ultimate user. They also may be employed for treating leather in order to improve its appearance and physical properties.

I claim:

1. A composition comprising a resinous material obtained by effecting reaction between ingredients including (1) an aldehyde and (2) a polymeric composition resulting from a condensation reaction between ingredients including (a) a triazine derivative represented by the general formula

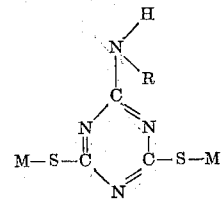

where R represents a member of the class consisting of hydrogen, alkyl, cycloalkyl, aralkyl, aryl and alkaryl radicals and M represents an alkali metal and (b) a compound containing at least two but not more than three halogen atoms selected from the class consisting of chlorine and bromine atoms and which are attached to a radical selected from the group consisting of hydrocarbon and oxyhydrocarbon radicals, each halogen being attached to a carbon atom in which all four valences are satisfied by single bonds.

2. A composition according to claim 1 in which the aldehyde is formaldehyde.

3. A composition according to claim 1 in which the halogenated compound is β,β'-dichloroethyl ether.

4. A composition according to claim 1 in which the halogenated compound is β,β'-dichloroethyl formal.

5. A composition according to claim 1 in which R represents hydrogen.

6. A heat-curable resinous composition comprising a heat-convertible product obtained by effecting partial reaction between ingredients comprising (1) formaldehyde and (2) a polymeric material resulting from a condensation reaction between ingredients including (a) at least one triazine derivative having the general formula

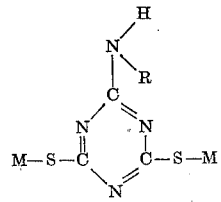

where R represents a member of the class consisting of hydrogen, alkyl, cycloalkyl, aralkyl, aryl and alkaryl radicals and M represents an alkali metal and (b) a compound having at least two but not more than three halogen atoms selected from the class consisting of chlorine and bromine atoms and which are attached to a radical selected from the group consisting of hydrocarbon and oxyhydrocarbon radicals, each halogen being attached to a carbon atom in which all four valences are satisfied by a single bond.

7. A product comprising the cured composition of claim 5 in an infusible, insoluble state.

8. A composition comprising the reaction product of (1) formaldehyde with (2) a linear polymer resulting from a condensation reaction between $\beta,\beta'$-dichloroethyl ether and the disodium salt of dithioammelide.

9. A composition comprising the reaction product of (1) formaldehyde with (2) a linear polymer resulting from a condensation reaction between $\beta,\beta'$-dichloroethyl formal and the disodium salt of dithioammelide.

10. A method of preparing new resinous materials which comprises effecting reaction between ingredients comprising (1) an aldehyde and (2) a polymer resulting from a condensation reaction between ingredients including (a) a triazine derivative represented by the general formula

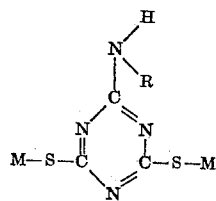

where R represents a member of the class consisting of hydrogen, alkyl, cycloalkyl, aralkyl, aryl, and alkaryl radicals and M represents an alkali metal and (b) a compound containing at least 2 but not more than 3 halogen atoms selected from the class consisting of chlorine and bromine atoms and which are attached to a radical selected from the group consisting of hydrocarbon and oxyhydrocarbon radicals, each halogen being attached to a carbon atom in which all four valences are satisfied by single bonds.

JACK T. THURSTON.

References Cited in the file of this patent

UNITED STATES PATENTS

| Number | Name | Date |
| --- | --- | --- |
| 2,211,709 | Zerweck | Aug. 13, 1940 |
| 2,217,667 | Bruson | Oct. 15, 1940 |
| 2,407,599 | Auten | Sept. 10, 1946 |
| 2,481,155 | Schaefer | Sept. 6, 1949 |

FOREIGN PATENTS

| Number | Country | Date |
| --- | --- | --- |
| 576,163 | Great Britain | Mar. 21, 1946 |